April 23, 1968 J. E. STANCHER 3,379,860
HEATER INSTALLATION
Filed Aug. 11, 1965 2 Sheets-Sheet 1
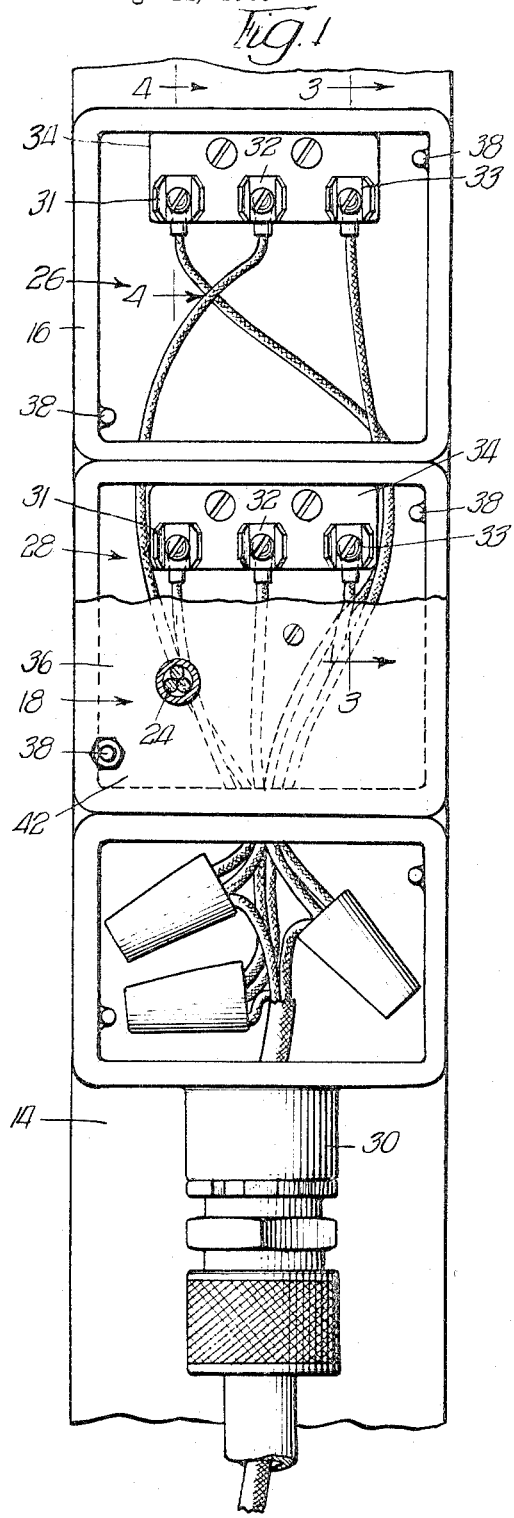
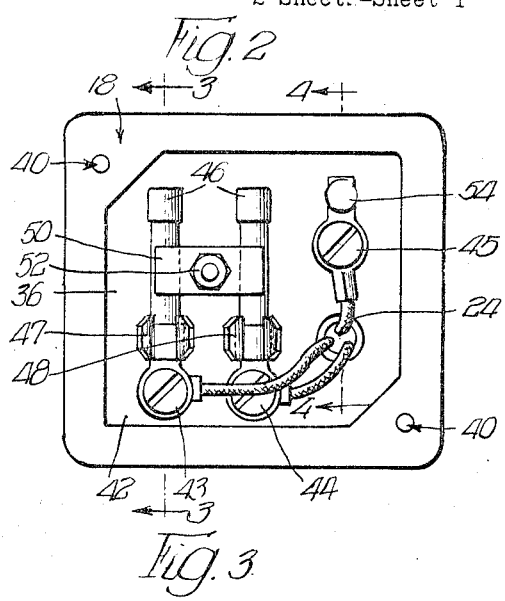
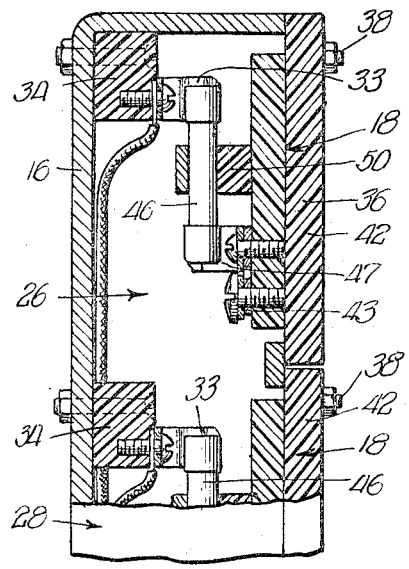
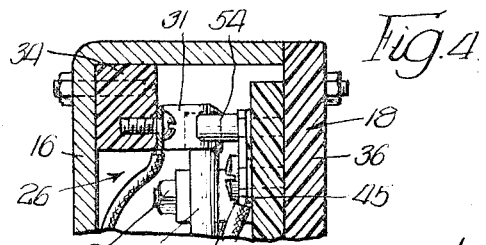
Inventor:
Joseph E. Stancher,
By Hume, Groen, Clement & Hume
Attys.

April 23, 1968     J. E. STANCHER     3,379,860
HEATER INSTALLATION
Filed Aug. 11, 1965     2 Sheets-Sheet 2
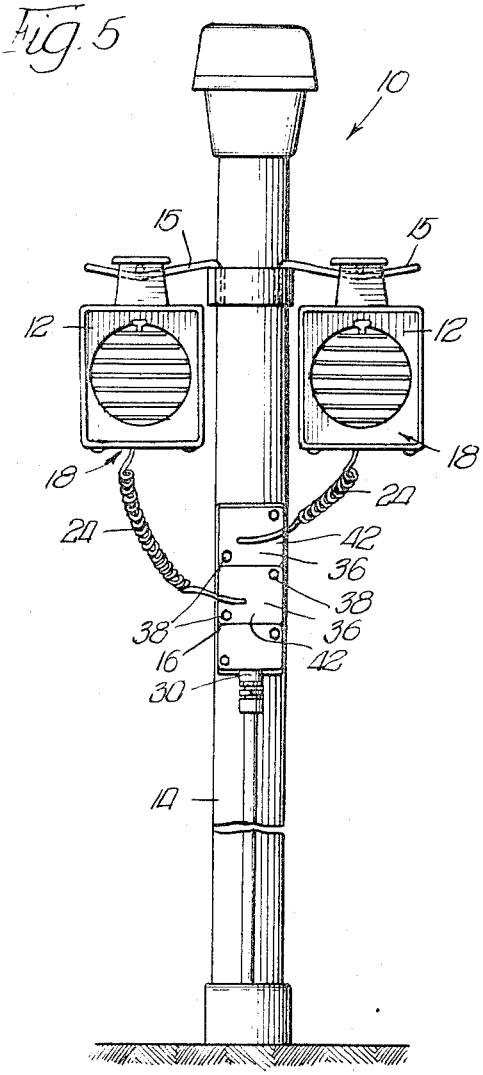
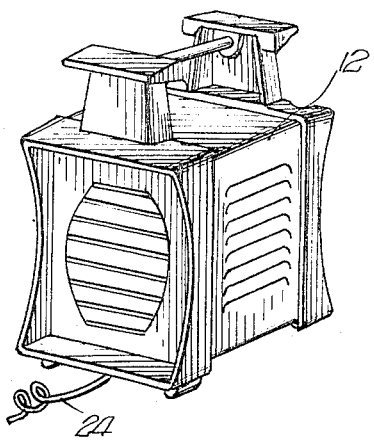
Inventor:
Joseph E. Stancher,
By Hume, Groen, Clement & Hume
attys

United States Patent Office 3,379,860
Patented Apr. 23, 1968

3,379,860
HEATER INSTALLATION
Joseph E. Stancher, Chicago, Ill., assignor to Essaness Theatres Corporation, Chicago, Ill., a corporation of Illinois
Filed Aug. 11, 1965, Ser. No. 478,892
1 Claim. (Cl. 219—533)

ABSTRACT OF THE DISCLOSURE

An automobile electrical heater system for outdoor drive-in movie theaters including an integral heater assembly removably secured to standards. The assembly includes a standard "in car" heater, a cover module and a connecting electrical cable. The cover module provides the only needed connection with the standard and contains fuses for the protection of the heater clamped therein. The cover module may be readily removed to visually inspect or replace the fuses or to remove the entire heater assembly. The electrical connection to the heater is automatically interrupted by the removal of the cover module.

---

The present invention relates to outdoor electrical heater installations.

It is an object of the present invention to provide an improved electrical heater system for outdoor drive-in movie theatres or the like.

It is another object of the invention to provide an outdoor electrical heater installation in which the electrical heaters and their fuses may be easily replaced or repaired.

It is a further object of the present invention to provide an outdoor electrical heater system for drive-in theatres or the like in which the heaters or their fuses may be quickly and safely replaced by inexperienced personnel at night or under adverse weather conditions and without shutting off power to other heaters.

It is a more specific object of the invention to provide an electrical heater installation for drive-in movie theatres in which individual heater assembly units, including the heater and its fuses, are adapted to rapidly mount or dismount from the station providing the electrical power for the heater.

The above and other objects and advantages of the present invention will become apparent from the following detailed description of one exemplary embodiment of the invention when considered in conjunction with the accompanying drawings wherein:

FIG. 1 is a front elevational view of the outlet box of an exemplary heater installation in accordance with the present invention;

FIG. 2 is a rear elevational view of a cover module of the exemplary heater installation;

FIG. 3 is a cross-sectional view taken along the line 3—3 in FIGS. 1 and 2 and showing the cover module of FIG. 2 mounted to the outlet box of FIG. 1;

FIG. 4 is a cross-sectional view taken along the line 4—4 in FIGS. 1 and 2;

FIG. 5 is an overall front elevational view of the exemplary heater installation; and FIG. 6 is a perspective view of one of the electrical heaters shown in FIG. 5.

Referring now to the drawings, there is shown in FIG. 5 an exemplary outdoor electrical heater installation 10 in which portable automobile heaters 12 for an outdoor drive-in movie theatre or the like are removably mounted upon a standard 14 and provided with electrical power through an outlet box 16. As particularly shown in detail in FIGS. 1–4, an entire individual heater assembly 18, including a heater 12 and its fuses, may be easily removed from the outlet box 16 and replaced with a new or repaired unit.

Because of frequent customer abuse and a high electrical power load, outdoor theatre automobile heaters are subject to frequent electrical failure. For effective and safe current control it has been found essential to provide current interruption means such as fuses for each individual heater, rather than providing a fuse or circuit breaker in a power line feeding a plurality of heaters. Heater failures and blown fuses most frequently occur at night and in winter weather, since this is when the heaters are in maximum use. Replacement of heaters or their fuses under such conditions has been difficult with prior heater systems, and has required considerable labor time and expense. The heater system 10 overcomes the above replacement problems by providing an integral heater assembly 18, including the heater and its fuses which may be rapidly disconnected from the standard 14 and replaced with another heater assembly 18. The components of the heater asembly 18 may then be conveniently repaired or replaced indoors under more favorable conditions and at a later time.

This standard 14 is preferably provided with a bracket 15 having two projecting arms supporting the portable car heaters 12. Each heater 12 may be any suitable electrical heater, preferably one specifically designed for "in-car" operation, such as the commercially available "Eprad" "Hot-Shot" illustrated in FIG. 6. The heaters 12 are each adapted to be removed from the bracket 15 and placed in a customer's car. They must each be supplied with a substantial quantity of electrical power through an elognate flexible coiled power cable 24, and this power is preferably supplied from the outlet box 16. The outlet box 16 is normally connected to an underground power cable which enters the base of the outlet box 16.

Turning now to FIGS. 1–4, there is shown therein in detail the outlet box 16 and the connecting components of the heater assembly 18. The outlet box 16 is secured to the standard 14 and provides a weatherproof connector enclosure and terminal box. Preferably it defines a pair of identical partial enclosures or openings 26 and 28 thereinto, which openings open only at a planar front surface. The openings 26 and 28 preferably communicate with one another inside the outlet box 16 and also communicate with a conventional power line inlet 30 at the base of the outlet box.

Preferably mounted inside each of the openings 26 and 28 is a set of three spaced electrical contacts for engaging corresponding contacts on the heater assembly 18. The three electrical contacts are provided in the illustrated exemplary structure by three identical conventional fuse end connector clips 31, 32 and 33. Preferably each clip is substantially spaced from the other clips and is fixed inside the opening by mounting to a block 34 of insulation material. The block 34 is in turn secured inside the outlet box 16. Preferably the form, spacing and electrical connection of the clips is the same for each opening, so that any heater assembly 18 may be mounted over any opening.

In the disclosed embodiment the clips 32 and 33 are each connected directly to the "hot" wires of the power line entering the outlet box through the inlet 30. The clip 31 is preferably connected to a ground lead or suitable ground circuit. While the contacts may be of any suitable type capable of carrying and interrupting the electrical power line current to a heater 12, the disclosed fuse end connector clips have a spaced pair of upstanding arcuate conductor surfaces adapted to springedly receive therebetween one conductive end of a conventional tubular type current fuse.

Turning now to the components of the heater assembly 18, FIG. 2 shows separately a cover module 36 adapted to fit over either the opening 26 or 28. Each cover module 36 preferably includes a rigid planar base 42 of insulation material corresponding generally to the dimensions of the openings 26 and 28. Preferably two sets of cover modules 36 are provided, one overlying each opening. The heater system 10 is preferably provided with a quick fastening means for securing the cover module 36, and thereby the heater assembly 18, to the outlet box 16. The illustrated means is provided by a pair of threaded bolts 38 extending from the outlet box at diagonally opposite corners of each opening 26 and 28. Corresponding apertures 40 in the cover module 36 receive therethrough the bolts 38, thereby aligning the cover module with the opening 26 or 28. The cover module 36 may then be tightly secured against the outlet box by nuts or other fasteners on the bolts 38. Each cover module 36 is adapted to completely overlie one of the openings 26 or 28 and provide a substantially weather tight sealing of the opening.

The heater assembly 18 is preferably an integral unit. The cover module 36 is secured to one end of the cable 24 and the heater 12 is secured to the other end. The end of the cable 24 at the cover module 36 preferably passes through an aperture in the base 42. The ends of the cable 24 conductors are thereby adjacent the inside surface of the module 36, where they are separately connected to conductor terminals 43, 44 and 45, respectively. In the disclosed embodiment these connector terminals 43, 44 and 45 are terminal lugs fastened by flat-head screws to the base 42. The conductor terminals 43 and 44 securing the two "hot" conductors are directly connected to fuse end connector clips 47 and 48. These clips 47 and 48 may be identical to the clips 31, 32 and 33 described above. Preferably the third, or ground conductor in the cable 24 is secured to the conductor terminal 45, which is in turn connected to a ground contact 54. In the embodiment shown the ground contact 54 is a projecting metallic pin or lug.

A pair of current fuses 46 for each heater 12 are preferably secured to each cover module 36. The fuses 46 are removable with the cover module 36 rather than being secured inside the outlet box 16. The fuses 46 are preferably of a conventional tubular type having an insulated central tube and cylindrical metal end caps at each end providing the contacts. The fuse end connector clips 32 and 33 are each adapted to resiliently clamp one end of a fuse and to thereby provide one electrical connection with the fuse. Similarly, the conductor clips 47 and 48 are each adapted to provide an electrical connection with the opposite end of a fuse. Thus, each fuse is in series with, and protects, one power line to the heater 12.

The fuses 46 are preferably secured to the cover module 36 by an insulated clamp 50. The clamp 50 rigidly secures both fuses 46 in a fixed position spaced above the base 42 on the inside of the cover module 36. Thus, when the cover modules are secured to the outlet box 16 the fuses are held inside the openings 26 and 28. The clamp 50 preferably holds both fuses parallel to the base 42 and thereby at right angles to the direction of the movement of the cover module 36 toward or away from the outlet box 16. Any suitable arrangement for the clamp 50 may be employed, it being desirable that the fuses be firmly fixed in a position on the cover module yet readily removable for replacement. It is also desirable that the fuses be partially exposed so that the condition of the fusible element may be ascertained. These advantages are provided by the illustrated arrangement, in which the fuses 46 may be readily removed by unscrewing the nut 52 to loosen the clamp 50. The fuses are clamped over their top and bottom surfaces, but are open for inspection at the sides.

Considering now the inter-connection of the cover module 36 with the outlet box 16, it will be observed that the sole electrical and mechanical connection between the heater assembly 18 and the standard 14 is provided through a quickly removable connection of the cover module 36 to the outlet box 16. That is, when the cover module 36 is lifted off of the outlet box 16, the entire heater assembly 18, including the individual heater 12, the cable 24 thereto and the fuses 46 may be taken away. Further, since the cover modules 36 are preferably substantially identical with one another, another heater assembly 18 may be immediately substituted.

The rapid mechanical mounting of the cover module base 42 to the outlet box 16 by means of the pair of bolts 38 passing through the aperatures 40 has been described above. This provides a suitable mechanical connection and alignment between the two units. A rapid electrical inter-connection is preferably solely the resilient mating of the corresponding positioned electrical contacts on the two units. Specifically, the ground circuit is completed by the fuse end connector clip 31 in the opening 26 resiliently engaging the ground contact 54 on the cover module 36. This provides a connection from the ground lead of the heater cable 24 to the ground lead in the outlet box 16. The electrical connection of the two power leads in the heater cable 24 is provided by resilient engagement of each of the clips 32 and 33 in the outlet box with one end of a fuse 46. In effect the "free" ends of the fuses (the ends not engaged by the clips 47 and 48) mate as plugs with the clips 32 and 33. In this manner there is provided through three pairs of resilient contacts an electrical inter-connection of the power lines in the outlet box with the heater 12.

The fuse ends of the fuses 46 and the ground contact 54 are specially related with respect to the clips 31, 32 and 33, so that a substantially simultaneous engagement occurs by each of the three pairs of contacts. Further, for safety purposes the contacts are positioned so that they cannot engage until the cover module 36 is nearly fully seated flush against the opening 26.

It will be seen that the above described electrical inter-connections are automatically made as the cover module 36 is mechanically installed to the outlet box 16, and correspondingly the connections are automatically broken as the cover module is mechanically removed. Thus, the personnel removing or installing heaters or fuses need not work upon, or be knowledgeable about the electrical circuitry. No wiring, taping, etc. is required. Further, this arrangement eliminates the need for turning off the electrical power on the power line when removing the heaters. This is a substantial advantage over the conventional practice in which power must be interrupted to all of the heaters on a given power line circuit when one heater is being removed or repaired, thereby discomforting other customers. With the above described arrangement only the circuitry of the individual heater assembly is interrupted.

An additional advantage of the heater system 10 is that a heater assembly 18 may be removed and a blank base 42 or other suitable members inserted in its place, merely as a cover over each of the openings 26 and 28. This allows inexpensive removal and indoor storage of all of the heaters 12 during the summer, which is highly desirable.

It is clear that from the above description that there has been provided by a present invention a new and improved outdoor electrical heater system with greatly improved convenience and safety for heater installation, removal and repair. Numerous modifications and variations of outdoor electrical heater systems in accordance with the present invention will be apparent to one skilled in the art, and it is intended to encompass in the following claim all such variations and modifications as fall within the true spirit and scope of the invention.

I claim:
1. An automobile electrical heater system for outdoor drive-in movie theaters or the like comprising:

a plurality of fixed standards, each said standard being adapted to removably support at least one electrical automobile heater thereon;

an electrical power outlet box secured to each said standard, each said outlet box defining at least one protected opening thereinto;

a first set of three spaced resilient electrical power contacts in said outlet box inside said opening;

means for connecting two of said first set of contacts to a source of electrical power and means for connecting the third of said first set of contacts to ground;

an integral removal automobile heater assembly including a cover module, an electrical automobile heater adapted to be supported by said standard and removable therefrom for insertion into an automobile, and an electrical cable mechanically and electrically interconnecting said cover module with said electrical heater, said heater assembly being secured to said standard solely by said cover module, and said cover module being removably secured to said outlet box at said opening overlying and weather enclosing said opening;

two electrical fuses on said cover module connected in protective series with said electrical automobile heater, each of said fuses having opposite first and second conductive ends and a visible fuse element therebetween with said first conductive end of each of said fuses being electrically connected to said cable, said fuses being removably secured to said cover module generally parallel thereto by an overlying fuse clamp removably secured to said cover module, said cover module and said fuse clamp being adapted to provide visual condition inspection of said fuses without the removal of said fuses, and a ground contact on said cover module electrically connected to said cable;

said ground contact and said second conductive ends of both said fuses engaging said first set of resilient electrical contacts in said opening of said outlet box only when said cover module is substantially fully seated against said opening;

said fuses and said ground contact being protectively contained entirely inside said opening in said outlet box with said cover module in place thereon, and said fuses being automatically removed from said outlet box by the removal of said cover module therefrom, and said ground contact and said second conductive ends of both said fuses automatically disengaging from said first set of contacts upon initial separation of said cover module from said outlet box.

References Cited

UNITED STATES PATENTS

| | | | |
|---|---|---|---|
| 947,987 | 2/1910 | Dallam | 200—129 X |
| 2,537,330 | 1/1951 | Carroll | 219—202 X |
| 2,646,496 | 7/1953 | Takach | 219—369 |
| 3,202,977 | 8/1965 | Sims | 339—147 X |
| 3,229,066 | 1/1966 | Rowe | 200—133 |

RICHARD M. WOOD, *Primary Examiner.*

C. L. ALBRITTON, *Assistant Examiner.*